J. J. HARMAN.
PIPE CUTTER.
APPLICATION FILED DEC. 2, 1921.

1,435,467.

Patented Nov. 14, 1922.

INVENTOR:
John J. Harman
By Coale Mayne
ATTORNEYS

Patented Nov. 14, 1922.

1,435,467

UNITED STATES PATENT OFFICE.

JOHN J. HARMAN, OF NEWTON, MASSACHUSETTS, ASSIGNOR, BY MESNE ASSIGNMENTS, TO OLD COLONY TRUST COMPANY, TRUSTEE, A CORPORATION OF MASSACHUSETTS.

PIPE CUTTER.

Application filed December 2, 1921. Serial No. 519,363.

*To all whom it may concern:*

Be it known that I, JOHN J. HARMAN, of Newton, in the county of Middlesex and State of Massachusetts, a citizen of the United States, have invented a new and useful Improvement in Pipe Cutters, of which the following is a full, clear, and exact description, reference being had to the accompanying drawings, forming a part of this specification, in explaining its nature.

The present invention relates to an improvement in a pipe-cutting tool of the type employing a number of pipe cutter wheels. Such a pipe cutter as customarily made comprises a pair of cutter wheels and opposing these a single cutter wheel. The pipe cutter is generally operated by successive backward and forward strokes of a handle causing the cutter wheels by suitable means of adjustment to engage the pipe, the wheels being occasionally tightened onto the pipe as the work proceeds. The wheels during the operation tend to sever the pipe by displacement of metal rather than by an actual cutting of the metal. The pipe cutter is inefficient in that there is not obtained a quick initial tracking of the cutter wheels around the pipe. The time required to sever the pipe is too protracted and the operation requires undue effort on the part of the operator. The operation is further inefficient in that it does not result in a complete cutting off or severance of the pipe, as the single cutter wheel will cut through a section of the pipe ahead of the other cutters necessitating the breaking of the unsevered portion of the pipe for completing the operation, which is sometimes a difficult matter and in any event results in leaving an undesirable burr.

The object of the invention is to overcome the difficulties above pointed out. I have found that the difficulties essentially arise from lack of uniformity in the action of the cutters, the single cutter tending to be more active than the other cutters, and that by obtaining a proper uniformity in the action of the cutters various difficulties heretofore encountered are eliminated and the efficiency of the tool materially increased.

The manner in which such uniformity is obtained can best be seen and understood by reference to the drawings in which—

Referring to the drawings:—

Figure 1:
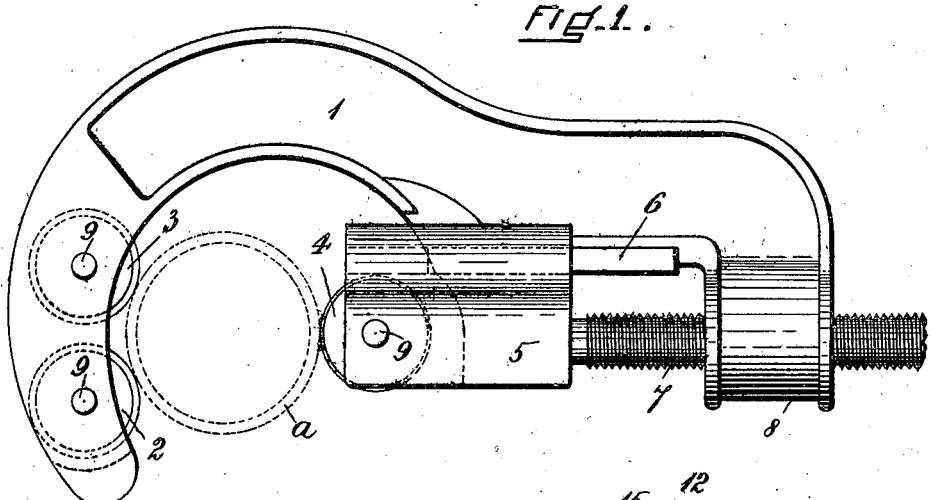
Figure 1 is a side elevation of a pipe cutter embodying my invention.
Figure 2:
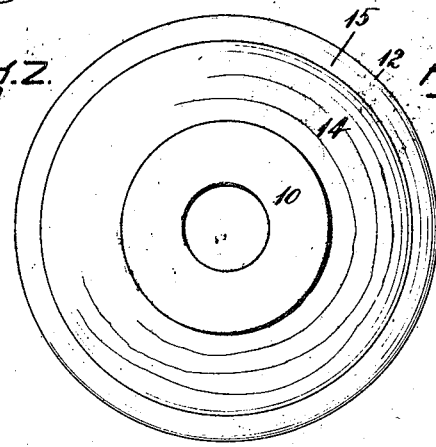
Fig. 2 is a side elevation of the single cutter wheel of the cutter.
Figure 3:
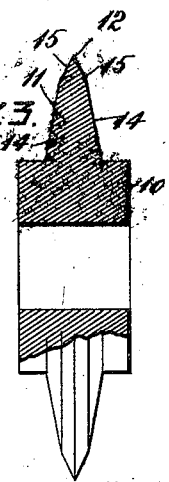
Fig. 3 is a cross section thereof.
Figure 4:
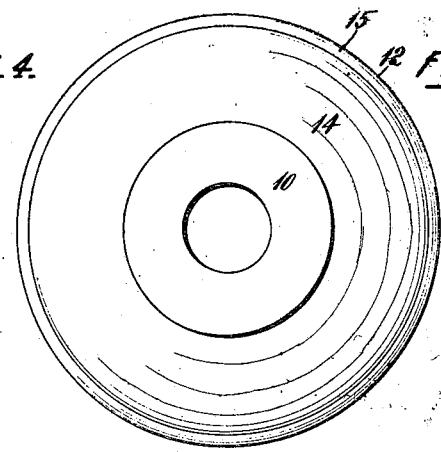
Fig. 4 is a side elevation of one of the pair of cutter wheels.
Figure 5:
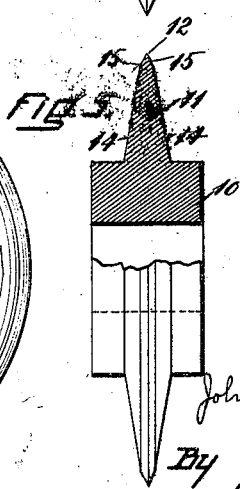
Fig. 5 is a cross section thereof.

1 represents the curved head or dog of the cutter carrying a pair of cutter wheels 2 and 3, respectively. Opposing these wheels is a single cutter wheel 4 carried by a block 5 slidably arranged upon a guideway 6 on the dog. The several cutter wheels are arranged to embrace the exterior surface of a pipe *a* and track around the same in the operation of the cutter. The sliding block and cutter wheel carried by it are movable toward or away from the work and thereby the single cutter wheel and in fact all the cutter wheels are tightened onto the pipe or work or released therefrom in the operation of the cutter. The block is moved by a screw 7 which passes through and has threaded connection with a boss 8 on the dog, the inner end of the screw being connected to the rear end of the block. The block and cutter wheel carried by it are moved backward and forward relatively to the pipe or work as the screw is turned in one direction or the other. The screw forms a portion of the shank of a handle (not shown) by means of which the screw is turned and by means of which, also, the cutter wheels are moved to engage the work by backward and forward strokes of the handle.

The cutter wheels 2 and 3 turn on pins fixed in the dog, the opposing wheel 4 on a pin fixed in the block.

Each of the cutter wheels comprises a central or hub-forming portion 10 through which the pin or shaft 9 extends. These hubs are preferably of the same size, both laterally and diametrically for all the wheels.

Each of the wheels is extended beyond its hub by a portion 11 the opposite sides of which converge to form a cutting edge 12. The side portions or faces 14 of the wheels leading directly from the hubs have preferably a slight angle of convergence, while the side portions or faces 15 beyond leading immediately to the cutting edge have a larger angle of convergence, the sides or faces 15 meeting at such angle as will enable the edge to properly displace the metal of the pipe or work during the operation of the tool without undue resistance. An angle of about 60 degrees is a preferred angle at which the faces meet which lead directly to the cutting edge and these angles are the same for all the wheels. The extent of the side faces 15 away from the cutting edge in a general diametrical direction varies for the respective wheels, those of the single cutter wheel being longer and accordingly possessing a larger area than corresponding surfaces of the other cutter wheels. Consequently soon after the cutters have become bedded in the pipe or work the single cutter wheel will meet with more resistance in its passage through the work than do each of the other cutter wheels. The difference between the surfaces 15 of the single cutter wheel and those of each of the other cutter wheels is so proportioned that the increased resistance offered the single cutter wheel will just about compensate for the normal undue activity of this cutter over the other cutters, thereby forcing it to operate in unison with the other cutters and enabling all the cutters to break through the work at the same time and likewise tending to overcome the difficulties previously referred to.

The dimensions of the wheels may vary according to the size of the wheel and work to be accomplished. In practice cutter wheels possessing the following dimensions have been found to be very effective for medium size work. Over all diameter of each of the wheels 1 7/16 inches; lateral extent or thickness of hub of each of the wheels .375 of an inch; diameter of hub of each of the wheels 23/32 of an inch; side faces 14 of all of the wheels incline inwardly at an angle of about 10 degrees; side faces 15 of all of the wheels meet to form a cutting edge at an angle of 60 degrees; side faces 15 of the single cutter wheels extends in a general direction diametrical to the wheel .087 of an inch; and the corresponding surfaces of each of the other wheels extend in like direction .042 of an inch. These dimensions are illustrative and may well be varied without departing from the spirit of the invention.

Having thus fully described my invention, I claim and desire to secure by Letters Patent of the United States:—

1. A pipe cutter of the type specified having a pair of cutter wheels and opposing the same a single cutter wheel, each of said wheels having a cutting edge and surfaces angular to one another meeting in said edge, said surfaces of the single cutter wheel bearing such relation to corresponding surfaces of each of the other wheels that the work will offer more resistance to the action of the single cutter wheel than to either of the other wheels whereby the single cutter wheel will function with substantial uniformity with the other cutter wheels in making a cut in the work as the tool is operated with successive forward and backward strokes.

2. A pipe cutter of the type specified having a pair of cutter wheels and opposing the same a single cutter wheel, each of said wheels having a cutting edge and surfaces angular to one another meeting in said edge, said surfaces of the single cutter wheel being longer than corresponding surfaces of the other wheels whereby the single cutter wheel will function with substantial uniformity with the other cutter wheels in making a cut in the work as the tool is operated with successive forward and backward strokes.

3. A pipe cutter of the type specified having a pair of cutter wheels and opposing the same a single cutter wheel, each of said wheels having a cutting edge and surfaces angular to one another meeting in said edge, the angularity between said surfaces being the same for all the wheels, the extent of said surfaces for the single cutter wheel being larger than the extent of corresponding surfaces for each of the other wheels whereby the work will offer more resistance to the action of the single cutter wheel than to either of the other wheels and the single cutter wheel function with substantial uniformity with the other cutter wheels in making a cut in the work as the tool is operated with successive forward and backward strokes.

4. A pipe cutter of the type specified having a pair of cutter wheels and opposing the same a single cutter wheel, each of said wheels having a cutting edge and surfaces meeting to form said edge, said surfaces of the single cutter wheel being so proportioned to the corresponding surfaces of the other wheels that the work will offer such resistance to the operation of the single cutter wheel as to cause this wheel to function with substantial uniformity with the other cutter wheels in making a cut in the work and thereby enable all the cutters to break through the work at substantially the same time as the tool is operated with successive forward and backward strokes.

JOHN J. HARMAN.